United States Patent Office 2,701,075
Patented Feb. 1, 1955

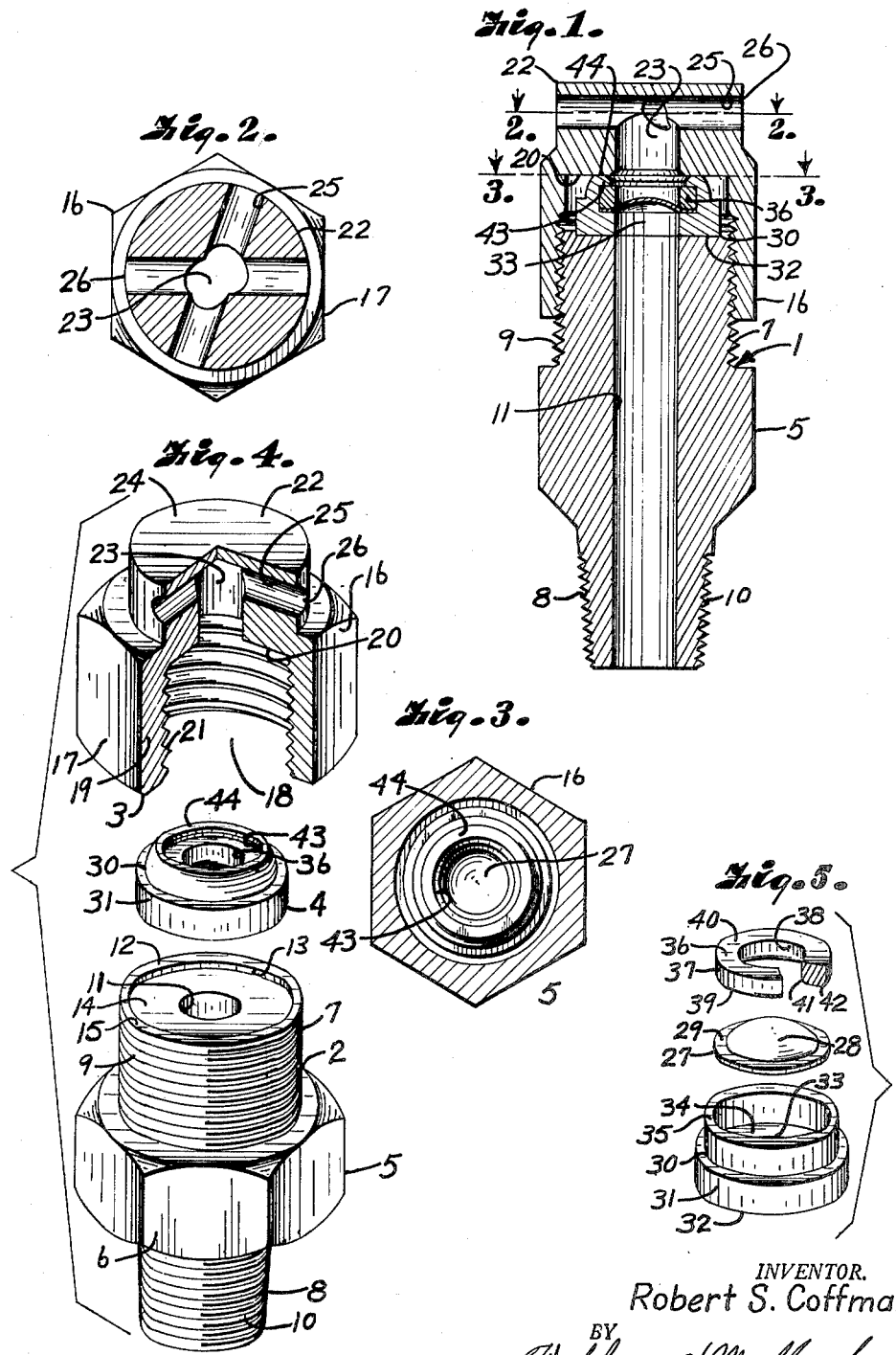

2,701,075

SAFETY DEVICE

Robert S. Coffman, Kansas City, Mo., assignor to Black, Sivalls & Bryson, Inc., Kansas City, Mo., a corporation of Delaware Application December 17, 1951, Serial No. 262,112

1 Claim. (Cl. 220—89)

This invention relates to safety devices for protecting pressure apparatus from the hazards of excessive pressure differentials.

When devices of this character include a rupture diaphragm, the insertion thereof between its clamping parts often results in scoring of the diaphragm and/or production of internal stresses which alternate the rupture pressure for which the diaphragm is desired, with the results that the diaphragm does not function at the calculated pressure differential. This is particularly true when the clamping elements have threaded connections or where the flange of the rupture diaphragm must be more or less deformed in effecting a leak tight peripheral seal.

It is, therefore, the principal object of the present invention to contain the rupture element or diaphragm within a rigid cartridge unit and which protects the rupture element from the alteration by the clamping pressures which are required in effecting a peripheral seal.

Other objects of the invention are to provide a safety device including simple and relatively inexpensive clamping parts particularly adapted for cooperation with the cartridge in effecting a leak tight seal; to provide a structure wherein the rupture element is securely sealed within the cartridge and inaccessible for separate replacement or for any alteration that might result in an unreliable safety device when installed for a given purpose; and to provide clamping parts particularly adapted for a thread connection.

In accomplishing these and other objects of the invention hereinafter pointed out, I have provided improved structure, the preferred form of which is illustrated in the accompanying drawing wherein:

Fig. 1 is a longitudinal section through a safety device including a replaceable cartridge unit embodying the features of the present invention.

Fig. 2 is a cross section through the safety device on the line 2—2 of Fig. 1, particularly illustrating the vent ports.

Fig. 3 is a similar section on the line 3—3 of Fig. 1.

Fig. 4 is a perspective view of the parts of the safety device shown in disassembled spaced relation, a part of the cap member being shown in section to better illustrate the construction thereof.

Fig. 5 is a perspective view of the part composing the replaceable cartridge with the parts shown in disassembled spaced relation and with the inner retaining ring in section to better illustrate the rounded contour of the inner and outer peripheries of the diaphragm contacting face thereof.

Referring more in detail to the drawing:

1 designates a safety device constructed in accordance with the present invention and which, in the form illustrated, is especially adapted for mounting within a threaded opening in a part of an apparatus to be protected from excessive pressure differentials. The device 1 includes separable clamping members 2 and 3 and a replaceable cartridge 4 which contains the rupture element.

The member 2 includes a polygonal shaped midportion 5 having faces 6 adapted to be engaged by a wrench when the safety device is to be installed in an apparatus to be protected. Extending coaxially from the midportion 5 are substantially cylindrical portions 7 and 8 provided with external threads 9 and 10, the threads 10 preferably being tapered to assure a tight fit within the relief opening of the apparatus to be protected. The member 2 has an axial passageway 11 through which the rupture element of the cartridge is subjected to differential pressures. The end face 12 of the portion 7 is provided with a recess 13 forming an inset annular seat or face 14 and an encircling rim 15 to seat and retain the cartridge 4 coaxially with the passageway 11 as best shown in Fig. 1.

The member 3 of the safety device includes a polygonal portion 16 having faces 17 adapted to be engaged by a wrench when applying and replacing the cartridge 4 as later described.

The polygonal portion 16 has an axial recess 18 opening from one end and terminating short of the opposite end to provide a wall 19 and a clamping face 20 which cooperates with the face 14 to retain the cartridge 4 therebetween. The inner face of the wall 19 is provided with threads 21 conforming with the threads 9 on the member 2 whereby the parts are adapted to be connected together and form a tight seal about the cartridge.

Extending from the closed end of the member 3 is a circular boss 22 having an axial bore 23 opening from the recess 18 and which is encircled by the clamping face 20. The bore 23 terminates short of the outer end face 24 of the boss 22 to form a cover over the cartridge. In order to provide vents for relief of the pressure fluid, the boss 22 has a plurality of radial passageways 25 connected with the bore 23 and having outlets 26 through the circumferential face of the boss as best shown in Figs. 2 and 4.

The cartridge 4 includes a rupture element 27 which is preferably of the type disclosed in the Gwynne Raymond patent on "Safety Device for High Pressure Vessels," Patent No. 1,930,960 of October 17, 1933, and includes a substantially dome shape or concavo-convex portion 28 and a circumferential flange 29, the dome portion 28 being of a diameter substantially conforming with the diameter of the passageway 11 as shown in Fig. 1.

The cartridge also includes a shell member 30 having a circumferential base portion 31 that is provided with an end face 32 corresponding with the seating or clamping face 14 of the member 2, previously described. The circumferential base portion 31 is of a diameter to fit snugly within the recess 13 so that a relief opening 33 in the shell is retained in coaxial registry with the passageway 11.

The opening 33 is encircled by a substantially flat clamping face 34 which seats the flange 27 of the rupture diaphragm. Extending from the base portion 31 in encircling relation with the face 34 is an annular flange 35 to form an enclosure for the rupture diaphragm and to retain the diaphragm within the cartridge shell. Cooperating with the face 34 of the shell is a clamping ring 36 having an outer circumferential face 37 adapted to be snugly received within the flange 30 and an inner annular face 38 which encircles the dome portion of the rupture diaphragm.

The ring 36 includes end faces 39 and 40 adapted to be engaged by the clamping face 20 of the member 3 and to seat on the flange 29 of the rupture diaphragm respectively. The inner and outer circumferential edges of the clamping face 39 extend in rounded curves 41 and 42 as best shown in Fig. 5 to avoid injury to the diaphragm and any defined edge over which the diaphragm may tend to break.

The cartridge is assembled by placting the rupture diaphragm within the open end of the flange 35 so that the flange 27 of the diaphragm seats on the face 30 of the shell member. The ring member 37 is then moved into position so that the face 39 seats on the flange 7. When the diaphragm and retaining ring are in position, the flange 30 projects beyond the face 40 of the retaining ring to be rolled over the ring and provide an inturned lip 43 which cooperates with the base portion of the shell in effecting a leak tight seal about the periphery of the rupture diaphragm.

Since the parts of the cartridge may be accurately formed and a predetermined pressure utilized in rolling the lip 43, the rupture diaphragm may be assembled in the cartridge without distortion that might cause alteration from its calculated rupture pressure.

An assembled cartridge is seated on the face 14 of the member 2 so that the face 32 seats on the face 14. In this position, the cartridge is retained in concentric relation with the passageway 11. The cap member 3 is then applied over the threaded portion 7 and turned with a suitable wrench or the like to engage the threads 21 with the threads 9 thereby effecting movement of the clamping face 20 into clamping contact with the end face 44 of the cartridge shell as best shown in Fig. 1.

Since the contact faces of the cartridge holding parts are mechanically formed, a leak tight seal is provided about the cartridge without altering the pre-established rupture pressure of the diaphragm. Therefore, when the parts are assembled and the safety device is applied to an apparatus to be protected, the diaphragm will rupture at its calculated pressure.

When the diaphragm has functioned under an excess pressure differential, the member 3 is unthreaded from the member 2 to remove the ruptured cartridge after which a new factory assembled cartridge is placed in position on the member 2, and the clamping member 3 is reapplied to again restore the safety device.

From the foregoing, it is obvious that I have provided a safety device with a removable cartridge that may be inexpensively manufactured and assembled at the factory so that the cartridge may be inserted and replaced without alteration of the calculated rupture pressure of the diaphragm. It is also obvious that I have provided simple and easily constructed clamping or retaining members which securely retain the cartridge and provide the necessary sealing pressure without affecting the rupture pressure of the diaphragm.

What I claim and desire to secure by Letters Patent is:

A safety device including a body member having a seat encircling a port extending through the body member, a frangible diaphragm supporting ring having an annular face engaging the seat of the body member and having an annular flange encircling a clamping face in said ring and extending coaxially away from said clamping face to cooperate in forming a recess within the said supporting ring, a frangible diaphragm in said recess and having a marginal flange directly engaging the clamping face of said supporting ring, a clamping ring in the recess and having a clamping face engaging a side of said marginal flange opposite the clamping face of the ring, said clamping face of the clamping ring joining with the inner circumferential face of said ring in a rounding curve to avoid and definite line of sheer between said clamping ring and the frangible diaphragm, said annular flange of the supporting ring having a crimp extending over the clamping ring for applying a sealing pressure between said clamping faces and the marginal flange of the diaphragm, said flange portion of said supporting ring having an annular end face opposite said annular seat engaging face, and a cap member having an annular seat engaging said end face of the flange of the supporting ring and having connection with said body member for applying a holding pressure on the respective sides of the supporting ring without applying additional pressure on the clamping ring.

References Cited in the file of this patent

UNITED STATES PATENTS

| | | |
|---|---|---|
| 2,097,511 | Caestecker | Nov. 2, 1937 |
| 2,194,159 | Bonyun et al. | Mar. 19, 1940 |
| 2,425,778 | Allen | Aug. 19, 1947 |
| 2,564,171 | Page | Aug. 14, 1951 |
| 2,620,038 | Somers et al. | Dec. 2, 1952 |

FOREIGN PATENTS

| | | |
|---|---|---|
| 10,791 | Australia | Jan. 6, 1933 |
| 578,008 | Great Britain | June 12, 1946 |